(12) United States Patent
Hagen et al.

(10) Patent No.: US 6,990,314 B1
(45) Date of Patent: Jan. 24, 2006

(54) MULTI-NODE POINT-TO-POINT SATELLITE COMMUNICATION SYSTEM EMPLOYING MULTIPLE GEO SATELLITES

(75) Inventors: Frank A. Hagen, Palos Verdes Estates, CA (US); Richard Flammang, Manhattan Beach, CA (US); Kar W. Yung, Torrance, CA (US); Donald C. D. Chang, Thousand Oaks, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 09/576,652

(22) Filed: May 22, 2000

Related U.S. Application Data

(63) Continuation-in-part of application No. 09/271,997, filed on Mar. 18, 1999.

(51) Int. Cl.
H04B 7/19 (2006.01)

(52) U.S. Cl. ............... 455/13.1; 455/13.2; 455/427
(58) Field of Classification Search .......... 342/388, 342/418, 357; 398/125; 455/427, 429, 430, 455/426, 12.1, 13.1; 370/95, 320, 325; 375/1; 244/158 R, 159
See application file for complete search history.

(56) References Cited

U.S. PATENT DOCUMENTS

| | | | |
|---|---|---|---|
| 2,470,787 A | 5/1949 | Nosker | 342/12 |
| 3,384,891 A | 5/1968 | Anderson | 342/357 |
| 3,544,995 A | 12/1970 | Bottenberg et al. | 342/46 |
| 4,161,730 A | 7/1979 | Anderson | 342/352 |
| 4,161,734 A | 7/1979 | Anderson | 342/352 |
| 4,359,733 A | 11/1982 | O'Neill | 343/6.5 |
| 4,613,864 A | 9/1986 | Hofgen | 343/357 |
| 4,819,227 A | 4/1989 | Rosen | 370/75 |
| 4,897,661 A | 1/1990 | Hiraiwa | 342/457 |
| 4,994,809 A | 2/1991 | Yung et al. | 342/108 |

(Continued)

FOREIGN PATENT DOCUMENTS

| | | |
|---|---|---|
| EP | 0 335 558 | 4/1989 |
| EP | 0682 416 A2 | 11/1995 |
| EP | 0 749 252 A | 12/1996 |

(Continued)

OTHER PUBLICATIONS

Colella, Nicholas J. et al., "The HALO Network™", IEEE Communications Magazine, Jun. 2000, pp. 142–148.

(Continued)

*Primary Examiner*—Nick Corsaro
*Assistant Examiner*—Raymond S Dean
(74) *Attorney, Agent, or Firm*—Georgann S. Grunebach

(57) ABSTRACT

A wireless communication system includes a satellite constellation consisting of a plurality of satellites. Each of the plurality of satellites is in an orbit whose eccentricity and inclination are perturbed relative to the same geosynchronous orbit. Each of the satellites in the constellation is capable of relaying signals in either direction between a central ground hub and a plurality of mobile user terminals. The plurality of satellites are configured such that the period of their geosynchronous orbit remains substantially constant at one sidereal day.

19 Claims, 5 Drawing Sheets

FORWARD LINK GROUND PROCESSING FACILITY

USERS

U.S. PATENT DOCUMENTS

| | | | |
|---|---|---|---|
| 5,006,855 A | 4/1991 | Braff | 342/357 |
| 5,099,245 A | 3/1992 | Sagey | 342/357 |
| 5,109,390 A | 4/1992 | Gilhousen et al. | |
| 5,111,209 A | 5/1992 | Toriyama | 342/357 |
| 5,126,748 A | 6/1992 | Ames et al. | 342/353 |
| 5,233,626 A | 8/1993 | Ames | 375/1 |
| 5,278,863 A | 1/1994 | Briskman | 375/1 |
| 5,319,673 A | 6/1994 | Briskman | 375/1 |
| 5,339,330 A | 8/1994 | Mallinckrodt | |
| 5,365,447 A | 11/1994 | Dennis | |
| 5,379,320 A | 1/1995 | Fernandes et al. | |
| 5,387,916 A | 2/1995 | Cohn | 342/44 |
| 5,408,237 A | 4/1995 | Patterson et al. | |
| 5,410,314 A | 4/1995 | Frush et al. | 342/26 |
| 5,423,059 A | 6/1995 | LoGalbo et al. | |
| 5,444,450 A | 8/1995 | Olds et al. | 342/357 |
| 5,467,282 A | 11/1995 | Dennis | |
| 5,485,485 A | 1/1996 | Briskman et al. | 375/200 |
| 5,525,995 A | 6/1996 | Benner | 342/90 |
| 5,572,216 A | 11/1996 | Weinberg et al. | |
| 5,589,834 A * | 12/1996 | Weinberg | 342/354 |
| 5,592,471 A | 1/1997 | Briskman | 455/52.3 |
| 5,592,481 A | 1/1997 | Wiedeman et al. | |
| 5,594,941 A | 1/1997 | Dent | |
| 5,608,722 A | 3/1997 | Miller | |
| 5,617,410 A | 4/1997 | Matsumoto | |
| 5,644,572 A | 7/1997 | Olds et al. | 370/324 |
| 5,739,785 A | 4/1998 | Allison et al. | 342/357 |
| 5,839,053 A | 11/1998 | Bosch et al. | 455/13.1 |
| 5,864,579 A | 1/1999 | Briskman | 375/200 |
| 5,867,109 A | 2/1999 | Wiedeman | |
| 5,903,549 A | 5/1999 | von der Embse et al. | |
| 5,907,813 A | 5/1999 | Johnson, Jr. et al. | |
| 5,918,157 A | 6/1999 | Wiedeman et al. | |
| 5,920,284 A | 7/1999 | Victor | 342/357.01 |
| 5,944,770 A | 8/1999 | Enge et al. | 701/707 |
| 5,945,948 A | 8/1999 | Buford et al. | 342/457 |
| 5,949,766 A | 9/1999 | Ibanez-Meier et al. | |
| 5,956,619 A | 9/1999 | Gallagher et al. | |
| 5,969,674 A | 10/1999 | Von der Embse et al. | 342/357.17 |
| 6,019,318 A | 2/2000 | Cellier et al. | |
| 6,020,845 A | 2/2000 | Weinberg et al. | |
| 6,032,041 A | 2/2000 | Wainfan et al. | |
| 6,067,442 A | 5/2000 | Wiedeman et al. | |
| 6,104,911 A | 8/2000 | Diekelman | |
| 6,126,116 A | 10/2000 | Cellier et al. | |
| 6,138,012 A | 10/2000 | Krutz et al. | 455/427 |
| 6,151,308 A | 11/2000 | Ibanez-Meier et al. | |
| 6,195,555 B1 | 2/2001 | Dent | |
| 6,226,493 B1 * | 5/2001 | Leopold et al. | 455/13.1 |
| 6,229,477 B1 | 5/2001 | Chang et al. | |
| 6,246,363 B1 | 6/2001 | Yung et al. | |
| 6,266,533 B1 | 7/2001 | Zadeh et al. | |
| 6,295,440 B2 | 9/2001 | Chang et al. | |
| 6,301,231 B1 * | 10/2001 | Hassan et al. | 370/316 |
| 6,313,790 B2 | 11/2001 | Chang et al. | |
| 6,314,269 B1 | 11/2001 | Hart et al. | |
| 6,324,381 B1 | 11/2001 | Anselmo et al. | |
| 6,325,332 B1 | 12/2001 | Cellier et al. | |
| 6,327,523 B2 | 12/2001 | Cellier et al. | |
| 6,336,030 B2 | 1/2002 | Houston et al. | |
| 6,337,980 B1 | 1/2002 | Chang et al. | |
| 6,340,947 B1 | 1/2002 | Chang et al. | |
| 6,377,208 B2 | 4/2002 | Chang et al. | |
| 6,388,615 B1 | 5/2002 | Chang et al. | |
| 6,389,336 B2 | 5/2002 | Cellier et al. | |
| 6,563,457 B2 | 5/2003 | Chang et al. | |
| 2001/0000167 A1 | 4/2001 | Chang et al. | |
| 2001/0045903 A1 | 11/2001 | Chang et al. | |
| 2002/0053987 A1 | 5/2002 | Chang et al. | |

FOREIGN PATENT DOCUMENTS

| | | |
|---|---|---|
| EP | 0776 099 A2 | 5/1997 |
| EP | 0 837 568 A2 | 4/1998 |
| EP | 0 845 874 A2 | 6/1998 |
| EP | 0 860 708 A | 8/1998 |
| EP | 0 860 709 A | 8/1998 |
| EP | 0 860 710 A2 | 8/1998 |
| EP | 0 860 952 A | 8/1998 |
| EP | 1 037 403 A2 | 9/2000 |
| EP | 1 148 662 A2 | 10/2001 |
| EP | 1 158 698 A2 | 11/2001 |
| GB | 2 271 902 A | 10/1993 |
| GB | 2 306 827 A | 5/1997 |
| GB | 2 349 045 | 10/2000 |
| JP | 2-28580 | 1/1990 |
| JP | 3-291584 | 12/1991 |
| JP | 4-27887 | 1/1992 |
| JP | 07146995 A | 6/1995 |
| JP | 08015405 A | 1/1996 |
| JP | 08-331030 | 12/1996 |
| JP | 09026328 | 1/1997 |
| JP | 09113600 A | 5/1997 |
| JP | 10090391 A | 4/1998 |
| JP | 10-209939 | 8/1998 |
| JP | 11-8579 | 1/1999 |
| WO | WO 90/13186 | 11/1990 |
| WO | WO 95/04407 | 2/1995 |
| WO | WO 96/22661 | 7/1996 |
| WO | WO 9851568 A | 11/1998 |
| WO | WO 99/13598 | 3/1999 |
| WO | WO 01/93458 A2 | 12/2001 |
| WO | WO 01/94969 A2 | 12/2001 |
| WO | WO 01/95520 A2 | 12/2001 |
| WO | WO 01/95522 A1 | 12/2001 |

OTHER PUBLICATIONS

Colella, Nicholas J. et al., "High Speed Internet Access via Stratospheric HALO Aircraft", INET 99 Proceedings, Internet Society, Technology, Wireless, 13 pages, June 8, 1999.

Colella, Nicholas, "HALO Network—The Birth of Stratospheric Communications Services & the Decline of Satellite Networks", http://www.angelhalo.com/techpaper6, Copyright 1997–1999.

Djuknic, Goran et al., "Establishing Wireless Communications Services via High–Aeronautical platforms: A Concept Whose Time Has Come?" IEEE Communications Magazine, Sep. 1997, pp. 128–135.

Martin, James N. et al., "HALO Network—The Cone of Commerce", http://www.angelhalo.com/techpaper2, copyright 1997–1998.

Martin, James N. et al., "HALO Network—Broadband Wireless Services from High Altitude Long Operation (HALO) Aircraft", http://www.angelhalo.com/techpaper2, copyright 1997–1998.

Akyildiz, Ian F. et al., "HALO (High Altitude Long Operation): A Broadband Wireless Metropolitan Area Network", IEEE International Workshop on Mobile Multimedia Communications, Nov. 1999, pp/.271–275.

K. K. Chan, F. Marcoux, M. Forest, L. Martins–Camelo, "A Circularly Polarized Waveguide Array for Leo Satellite Communications", pp. 154–157, IEEE1999 AP–S International Symposium, Jun. 1999.

M. Oodo, R. Miura, Y. Hase, "Onboard DBF Antenna for Stratospheric Platform", pp. 125–128, IEEE Conference on Phased Array Systems and Technology, California, May 21–25, 2000.

Yokosuka Research Park, "The First Stratospheric Platform Systems Workshop", pp 1–216, May 12–13, 1999.

Teles J et al.: "Overview of TDRSS" Orbit Determination and Analysis. PSD Meeting, Cospar Technical Panel on Satellite Dynamics, $13^{th}$ Cospar Scientific Assembly, Hamburg, Germany, Jul. 11–21, 1994, Advances in Space Research, pp. 67–76.

Bricker, P et al.: "Integrated Receiver for NASA Tracking and Data Relay Satellite System", MILCOM 90. A new Era, 1990 IEEE Military Communications Conference, Monterey, CA, USA, Sep. 30–Oct. 3, 1990, p. 1–5.

Dunham, J B, et al.: "Onboard Orbit Estimation with Tracking and Data Relay Satellite System Data", Journal of Guidance, Control, and Dynamics, Jul.–Aug. 1983, USA, vol. 6 NR.4, pp. 292–301.

K. H. Bethke, "A Novel Noncooperative Near–Range Radar Network or Traffic Guidance and Control on Airport Surfaces", IEEE Transactions on Control Systems Technology, vol. 1, No. 3, Sep. 1993.

Doc 9524 FANS/4–WP/76, International Civil Aviation Organization, Special Committee on Future Air Navigation Systems, Fourth Meeting, Montreal, May 2–20, 1988, Report, pp. 3.2B–2 & 3.2B–3.

U.S. Appl. No. 09/584,012, filed May 30, 2000, Chang et al.

U.S. Appl. No. 09/576,648, filed May 22, 2000, Yung et al.

U.S. Appl. No. 09/644,225, filed Aug. 21, 2000, Hagen et al.

U.S. Appl. No. 09/587,960, filed Jun. 6, 2000, Yung et al.

U.S. Appl. No. 09/587,759, filed Jun. 6, 2000, Yung et al.

U.S. Appl. No. 09/271,997, filed Mar. 18, 1999, Chang et al.

U.S. Appl. No. 09/209,062, filed Dec. 10, 1998, Yung et al.

U.S. Appl. No. 09/550,505, filed Apr. 17, 2000, Chang et al.

U.S. Appl. No. 08/803,937, filed Feb. 21, 1997, Chang et al.

U.S. Appl. No. 09/669,095, filed Sep. 25, 2000, Yung et al.

U.S. Appl. No. 09/665,498, filed Sep. 5, 2000, Chang et al.

* cited by examiner

| Orbital Parameters: | Sat0 | Sat1 |
|---|---|---|
| Altitude: | GEO | GEO |
| Longitude of Asending Node: | 100°W | 110°W |
| Inclination (i): | 0° | 10° |
| Eccentricity: | -- | 0.087 = i/2 |
| Argument of Perigee | -- | 90° |

MULTI-NODE POINT-TO-POINT SATELLITE COMMUNICATION SYSTEM EMPLOYING MULTIPLE GEO SATELLITES

CROSS-REFERENCE TO RELATED APPLICATIONS

The present application is a continuation-in-part of assignee's co-pending U.S. Ser. No. 09/271,997, entitled "Multiple Satellite Mobile Communications Method and Apparatus for Hand-Held Terminals," filed on Mar. 18, 1999.

TECHNICAL FIELD

The present invention relates generally to a satellite communication system. More specifically, the present invention relates to a satellite communication system with increased frequency re-use capability for point-to-point communication.

BACKGROUND ART

Current mobile satellite communication systems, such as Iridium, Globalstar, and ICO, utilize low-cost user terminals as one of their key system features. To maintain communications linkage with these current mobile systems, the system satellites provide multiple beam and high-gain services to the subscribers. The low-cost and low-gain handheld terminals utilized by the users of these systems, transmit and receive signals to and from high performance satellites which populate almost the entire hemisphere. Some of these current systems require access to at least two satellites to assure a soft hand-over process as the satellites progress from horizon to horizon. As a result, the satellite system becomes more reliable and available as more satellites come into a user's field of view (FOV). The satellite constellations provided by these current systems are thus sized to guarantee a minimum number of satellites within a user's FOV over large coverage areas at all times.

All of these current mobile satellite communication systems, however, suffer from certain disadvantages. First, they all have limited frequency (the term "frequency" is generalized here to refer to frequency time slot or CDMA code) resources. Any given frequency over a given ground position can only be utilized by one user at a time. Thus, if one user accesses a satellite using a particular frequency to communicate to his counterpart on the network, other satellites and/or users in the same region cannot reuse the same frequency resource in the same local area. In particular, if a nearby secondary user has a handset that requires the same frequency resource as is being utilized by the first user, the second user is unable to access the system, even via different satellites. This is true regardless of the sophistication of the system, including systems that utilize multiple beam satellite designs. Even when multiple satellites are available at a given geographic location, the same frequency spectrum cannot be used by more than one user in a local area. The availability of multiple satellites merely serves to increase the availability of the system to the user. However, the total capacity of these mobile communication satellite systems is still limited by their inefficient usage of the available frequency resources. Thus, the potential growth of these current satellite communication systems is inherently limited.

Additionally, current telecommunications systems generally allow only mobile-to-hub and hub-to-mobile communications in most low earth orbit and medium earth orbit mobile satellite constellations. Mobile-to-mobile linkages require multiple hops between hubs. This means that two or more frequency resources must be committed by the system to close the link. It is clearly desirable to provide a mobile communication satellite system that relaxes the above constraints, and more efficiently utilizes current mobile satellite communication system resources, while also providing much greater opportunity for system growth.

SUMMARY OF THE INVENTION

It is an object of the present invention to provide a satellite communication system with reduced limitations on frequency re-use for point-to-point communications.

It is another object of the present invention to provide a satellite communication system that utilizes individual transponders and mobile terminals that are relatively simple and of low complexity.

It is a further object of the present invention to provide a satellite communication system with high system reliability through graceful degradation.

It is still another object of the present invention to provide a satellite communication system wherein the individual transponders and the mobile terminals are both of low complexity, and with the complexity of the system concentrated at the central processing hub stations.

It is yet a further object of the present invention to provide a satellite communication system utilizing a plurality of satellites in orbits which are slightly perturbed relative to a single GEO reference orbit (or slot).

It is still an additional object of the present invention to provide a satellite communication system whose capacity can be readily and easily increased.

In accordance with the objects of the present invention, a wireless communication system is provided. The wireless communication includes a satellite constellation consisting of a plurality of satellites each in an orbit which is slightly perturbed relative to the same geosynchronous orbit. Each of the satellites in the constellation is capable of communicating with a ground hub for receiving signals processed by the ground hub and which are radiated by the ground hub to a plurality of the plurality of satellites. Each of the satellites is capable of communicating with a plurality of mobile user terminals for reradiating said signal to an intended user. The orbits of the plurality of satellites are all perturbed relative to the same geosynchronous reference orbit in such a way that their periods remain substantially constant (i.e., one sidereal day).

These and other features of the present invention will become apparent from the following description of the invention, when viewed in accordance with the accompanying drawings and appended claims.

BEST MODE(S) FOR CARRYING OUT THE INVENTION

Referring now to the figures, the disclosed mobile communication system can be utilized to break away from the frequency spectrum limitation discussed above and provide much more efficient means to re-use the allocated mobile satellite and wireless spectrum multiple times. By eliminating this frequency spectrum limitation, or the operation of multiple satellites, the overall capacity of existing mobile satellite and wireless communication systems can more readily expand.

Figure 1:
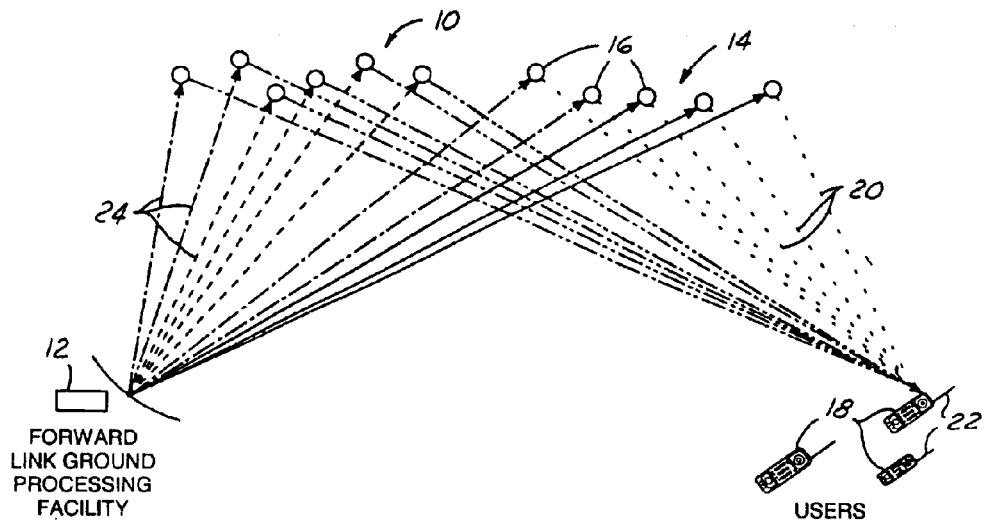
FIG. 1 is a schematic illustration of the forward link geometry of a mobile satellite communications system in accordance with the present invention.

Referring now to FIG. 1, a mobile satellite communication system 10 in accordance with a preferred embodiment of the present invention is illustrated. In FIG. 1, the mobile satellite communications system 10 is illustrated in a forward link mode. The mobile satellite communications system 10 includes a ground telecommunications hub 12, a satellite constellation 14 including a plurality of individual satellites 16, and a plurality of hand-held user terminals 18 such as mobile phones. As discussed in more detail below, the user terminals 18 can receive signals 20 simultaneously from multiple satellites 16 via their broad beam antennas 22. The ground telecommunications hub 12 is in communication with all of the satellites 16 in the satellite constellation 14 individually and simultaneously. The hub 12 also pre-processes user signals to compensate for path differentials before sending radiated signals 24 to the satellites 16, as discussed in more detail below.

In accordance with the preferred embodiment, the design of the individual satellites 14 can be significantly simplified over those utilized in prior mobile systems because the satellite constellation 14 functions as a sparse radiating array. It is known that the more satellites 16 that are included in a satellite constellation 14, the better the performance the mobile satellite communications system 10 will achieve. Satellites that are simple, small, and provide high performance are preferable. This is because the performance of the system 10 depends more heavily on the satellite constellation 14 than on the individual satellites 16.

In a transmit mode, shown in FIG. 1, the individual satellites 16 radiate modulated RF power to a chosen field of view ("FOV"). The system 10 is still operable with reduced capacity and no reconfiguration even if one individual satellite 16 is lost for any reason. As a result, the system 10 features graceful degradation characteristics and provides very high reliability and availability. Most of the complexity of the system 10 is located in the ground hubs 12, which locate and track the potential users and perform the major functions of beamforming and filtering, as discussed below.

Figure 2:
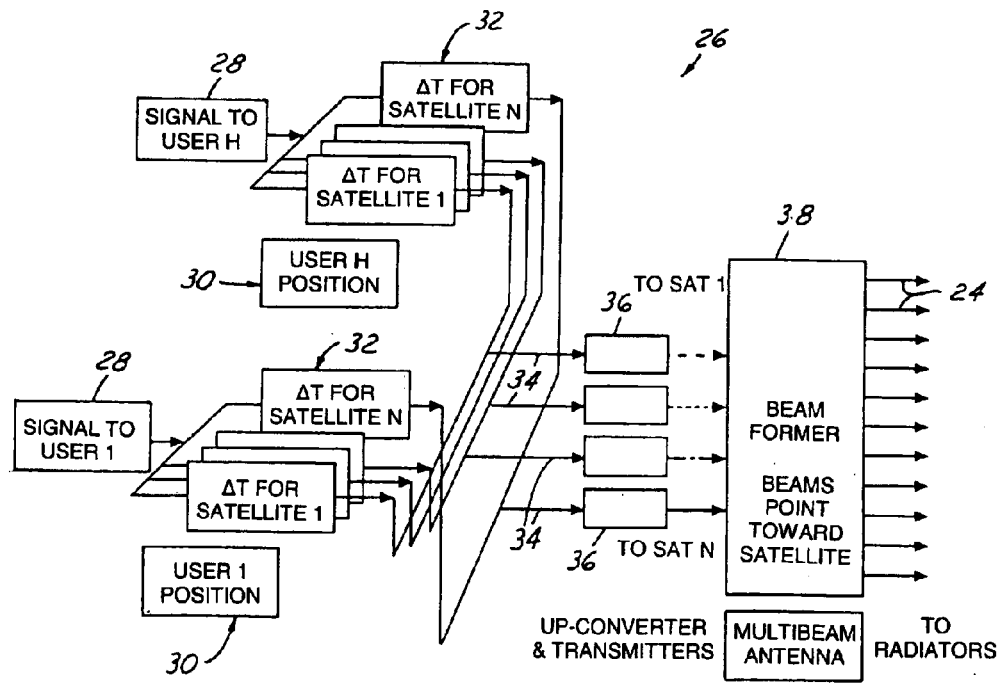
FIG. 2 is a schematic block diagram illustrating the signal transmission function of a ground telecommunications hub for a wireless communications system in accordance with a preferred embodiment of the present invention.

As shown in FIG. 2, the processing performed at the ground telecommunications hub 12 is diagrammatically illustrated. The hub 12 tracks, updates, and forward predicts the time variant differential information among various paths between the hub 12 and the intended user terminals 18. The accuracy of this information must be within a tenth of an RF wavelength. For UHF satellite systems, the required path differential accuracy is preferably about ten (10) centimeters. For L and S band mobile satellite constellations, the accuracy must be on the order of one (1) centimeter. Unfortunately, the conventional or GPS techniques are not able to provide the required accuracy.

In accordance with the present invention, the required accuracy of the equivalent path differentials, including all propagation distortion, can be provided using two-way active calibration and R2N (two-way ranging navigation) techniques. An R2N technique is just one technique for obtaining positioning information by which to locate the positioning of the satellites and users precisely using multiple calibration sites and is described in co-pending U.S. patent application Ser. No. 09/209,062, entitled "Method and System for Determining a Position of a Transceiver Unit Incorporating Two-Way Ranging Navigation as a Calibration Reference for GPS," and filed on Dec. 10, 1998. Other known techniques may also be utilized.

The ground telecommunications hub 12 has a processing center 26 that processes each signal and is shown in a transmit mode in FIG. 2. The hub 12 has the capability to address the plurality of satellites 16 individually through the use of antenna spatial discrimination to provide separate signals to different satellites. Alternatively, code identification can also be used to address different satellites independently.

As shown in FIG. 2, assuming that there are "H" users, the signals from user 1 to user H, identified generally by reference number 28, are input into the processing center 26. The position of the various users (1 to H), are determined generally by the circuitry from the various user signals 28, designated by reference number 30. The various user signals 28 for user 1 to user H are then combined for transmission to the different satellites 16, as generally indicated by reference number 32. In this case, the signal is sent to N satellites. The combined signals are then amplified, filtered, up converted, and then further amplified, as generally indicated by reference number 36. These signals are then delivered to a multiple beam antenna 38 where beam-forming processing is done so that the signals can be transmitted to the N satellites via radiating signals 24. The beam-forming process can be done in baseband or a low IF frequency band by either digital or analog means. For a low bandwidth (less than a few MHz signals), digital implementation can provide cost advantages. The processed signal 24, radiated from the ground hub 12 to each satellite, is amplified, filtered, and then re-radiated by each of the multiple satellites 16 to arrive at a designated user location simultaneously. Consequently, the radiated signals from the multiple satellites will be received coherently by a simple hand-held terminal 22.

Equivalently, the effect of the spatial processing performed by the processing center 26 is to focus signal strength on the user from multiple satellites 16, which act like sparsely separated portions of a large active reflector. Therefore, the processing on the ground will insert different time delays into the signals 24 which are radiated via various paths. The time delays will be inserted into the signals 24 as if the satellites were located on an ellipsoidal surface, of which the two foci are located exactly at the hub 12 and the designated user 18 positions respectively. In low and middle earth orbit constellations, the users 18 and the hub 12 will always be in the near field of the sparse array.

Figure 3:
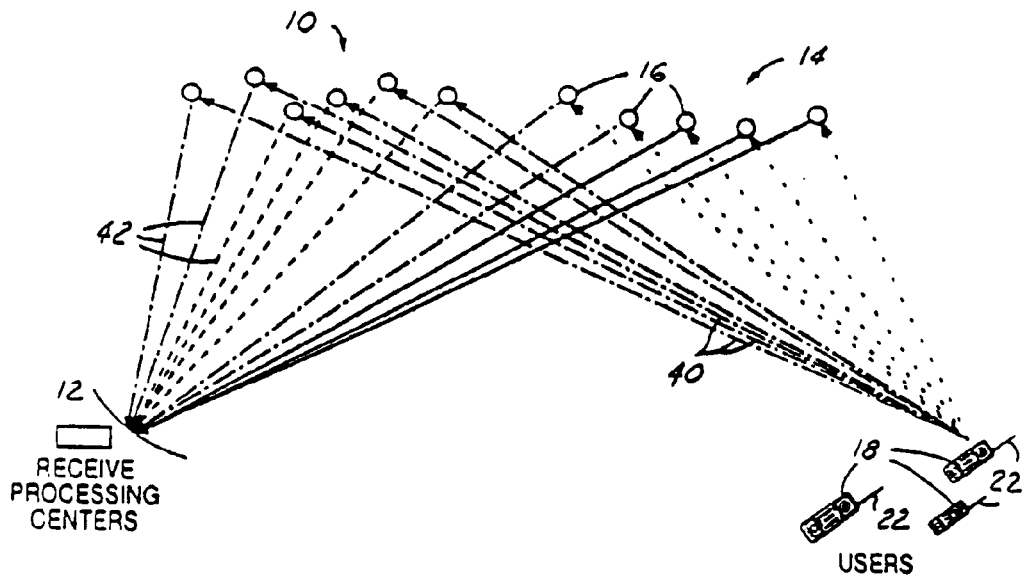
FIG. 3 is a schematic illustration of the return link geometry of a wireless communications system in accordance with a preferred embodiment of the present invention.

In a receive mode, shown in FIG. 3, the individual satellites 16 collect RF signals from the same FOV. FIG. 3 illustrates the return link geometry for receiving signals sent from the user terminals 18 to the ground telecommunications hub 12. As shown in FIG. 3, there are two groups of links involved: the links between users 18 and the satellites 16, generally indicated by reference number 40, and those between the satellites 16 and the hub 12, as generally indicated by reference number 42. For best performance, the user antennas 22 preferably are able to illuminate all the satellites 16 involved. This will lead to a constraint on the variation of the gain of the user antenna 22 over the cluster.

As with the forward link geometry, the satellites 16 will amplify the signals (links) 40 received from the users 18 and re-radiate the signals 42 toward the hub 12. The hub 12 can receive signals 42 independently, but simultaneously from the satellites 16, and will add the signals 42 from different satellites coherently in the post-processor 44 as illustrated in FIG. 4.

Figure 4:
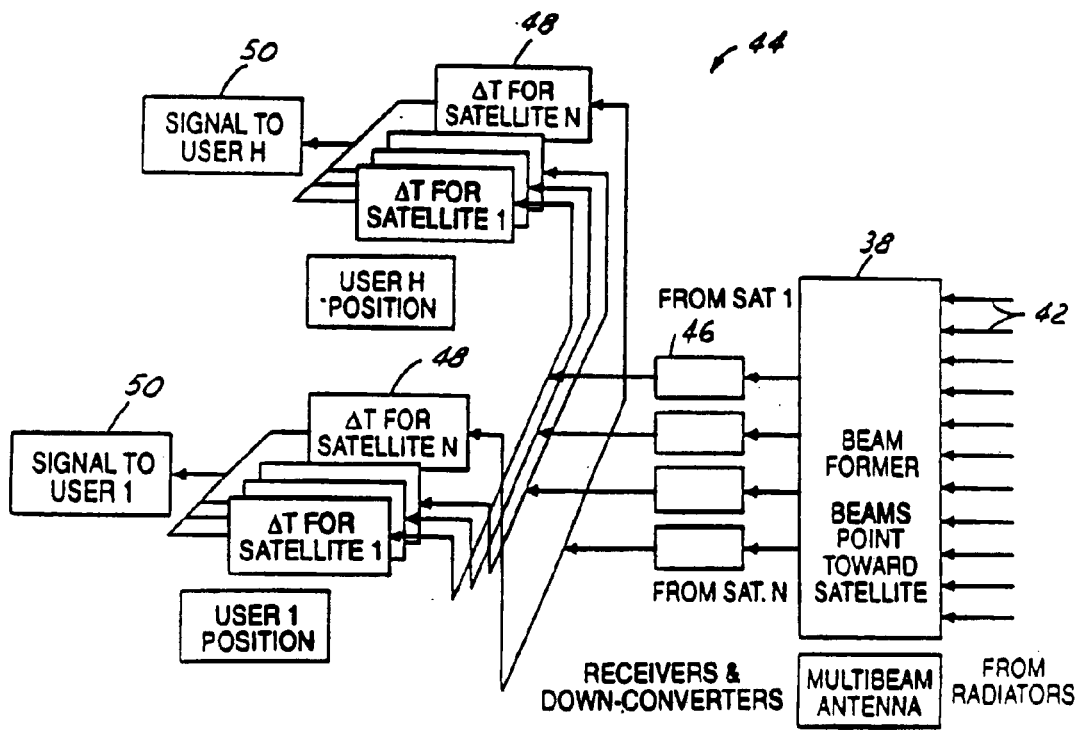
FIG. 4 is a schematic block diagram illustrating the signal receive function of a ground telecommunications hub for a wireless communications system in accordance with a preferred embodiment of the present invention.

The signal flows on the block diagram shown in FIG. 4 illustrate the receive function of the post-processor 44 and the hub 12. The signal flows are reversed from the corresponding ones in FIG. 2. Therefore the receive process will not be reiterated in detail. However, the links 42 from the satellites 16 to the hub 12 are received at the beamformer 38 and then transferred to the receiver and down converters 46 before the signals are separated. The signals are separated depending upon the user from which they are received, as generally indicated by reference number 48, and then sent to the specific user 1 through H, as generally indicated by reference number 50. It should be understood that both the receive and transmit functions are a necessary part of the pathlink calibration and user positioning.

The technique of the present invention has been demonstrated to significantly reduce the average side loeb levels. It has been determined that this is due to three factors. First, the proposed architecture is not a periodic array, but rather a randomly spaced sparse array, which has no grating lobes. Although the average side lobe level at a single frequency is relatively high, the level decreases with increasing bandwidth. Second, the large sparsely filled array formed by moving satellites is a large extended aperture size. Thus, all of the users on the ground are in the near field of the extended aperture and the wave fronts received by all users are spherical instead of planar. Consequently, dispersion effects become much more pronounced than would be the case in the far field. The dispersion grows very fast as a probe is scanned away from the main beam and the dispersion smears the power distribution very effectively over a finite signal bandwidth. Third, the communication system is preferably designed with a large frequency bandwidth. The information signal will therefore be spread over this bandwidth via CDMA or through short duration waveforms for TDMA schemes.

Figure 5:
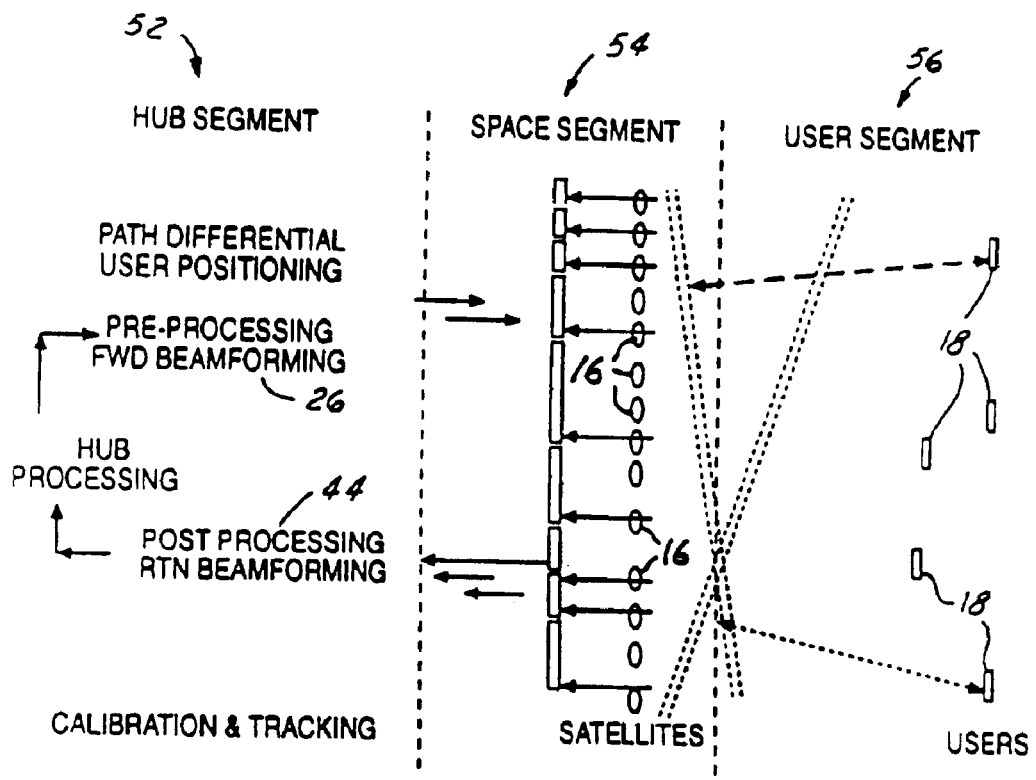
FIG. 5 is a schematic flow diagram illustrating the overall architecture for a multiple transponder wireless communications system in accordance with a preferred embodiment of the present invention.

FIG. 5 illustrates diagrammatically the operation of the invention, which allows for the increased re-use of precious frequency spectrum, by multiple satellites. The advantages provided by this system include no limitation on frequency re-use by additional satellites for point-to-point communications. Rather, the capacity of this system is only limited by total satellite RF power. Further, the preferred embodiment allows for the use of simple and low cost satellite designs, because the more satellites included in the constellation, the better the performance of the overall system. The system also provides high system reliability through graceful degradation, as well as concentrating complex processing at the hubs.

The preferred embodiment creates demand for a large number of low cost satellites and also uses R2N techniques to perform satellite and user positioning. The more users using this system, the more accurately the satellite and user positions can be determined. However, even more important than the actual positions of the users and satellites are the path lengths traversed by the signals. Therefore, periodic calibration techniques applied directly to those path lengths may be much simpler and more cost effective. Further, the system also benefits from the large percentage bandwidths available with CDMA and TDMA systems.

As shown in FIG. 5, the present invention is divided up into three segments: a hub segment 52 containing the ground telecommunications hub 12, a space segment 54 containing a plurality of individual satellites 16, and a user segment 56, having a plurality of user terminals 18. The hub segment also has a processing center 26 and a post-processor 44 for processing the received and transmitted signals.

The user terminals 18 receive and transmit signals simultaneously from/to multiple satellites 16 via their broad beam antennas. The user terminals 18 do not require any capability to separately address the individual satellites 16 of the space segment 54. The hub 12 maintains links with each of the satellites 16 in the space segment 54 individually and simultaneously. The hub 12 pre-processes the signals intended for each user on transmission and post-processes the signals supplied to each user on reception to compensate for path differentials. These corrections are separately computed and applied to the signals transmitted to or received from each satellite 16 of the space segment 54.

As discussed above, the design of the satellites can be significantly simplified when using the architecture of the disclosed system 10. This is primarily because there is no need to constrain the satellite coverage area and/or to subdivide the available bandwidth in order to isolate the users served by the various satellites from one another. With respect to the forward link operation, it is sufficient for each satellite 16 to simply re-broadcast a single wide-bandwidth signal received from the hub 12 over a single large coverage area. Because the signal is broadcast over the entire coverage area, the size of the required antenna can be significantly reduced. Furthermore, satellites can be added to the constellation without any change to the satellite antennas. The same attributes also apply to the return link operation. Accordingly, high performance (i.e., throughput) satellites that are relatively simple and small are preferably used with the disclosed system 10.

Figure 6:
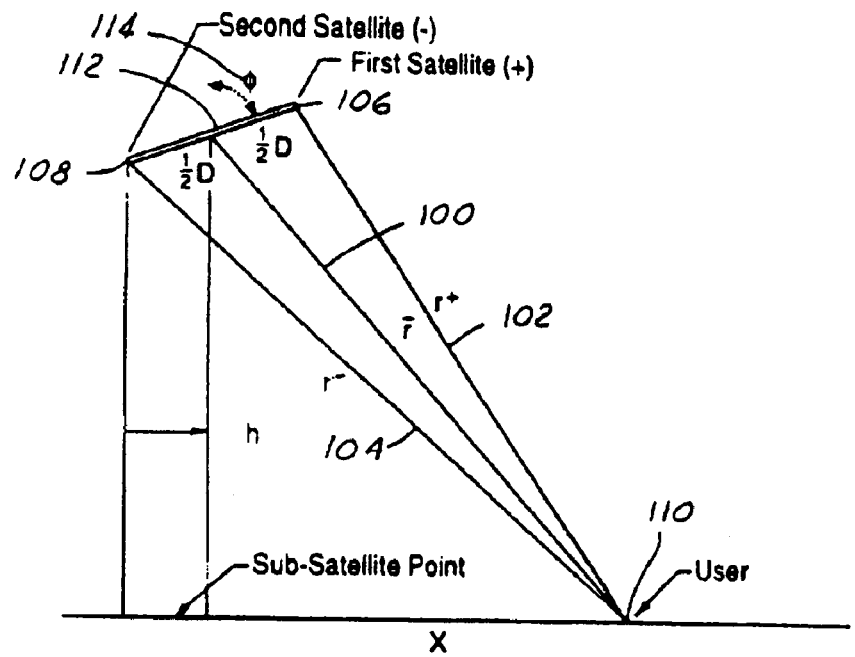
FIG. 6 is a schematic diagram illustrating the geometry used to obtain spatial relationships between a pair of perturbed geosynchronous satellites in accordance with a preferred embodiment of the present invention.

It will be understood that the disclosed system 10, while disclosing a multitude of satellites in the preferred constellation, can also operate when the constellation is reduced to a single pair of satellites 16. This is despite the fact that neither the synthesized antenna nor the beam formed thereby can be easily visualized. When the satellite constellation is reduced in this manner, the antenna pattern normally generated by the constellation is replaced by a fringe pattern characteristic, such as that generated by an interferometer. Two known important spatial dimensions characterize such a fringe pattern. The first of these is the fringe period (i.e., the distance between maxima). Referring to the simplified geometry shown in FIG. 6, this period may be determined (to a very good approximation) as follows:

$$\lambda_{IF} = \frac{\lambda \bar{r}}{D_{base} \sin\phi_{base}}$$

where $\lambda_{IF}$ is the distance between fringe maxima on the ground plane (m);

$\lambda$ is the RF wavelength of the radiation (m);

$\bar{r}$ is the slant range 100, or average of the pathlengths 102, 104 to each of the two elements (i.e., satellites) 106, 108 of the interferometer from the specific point 110 in question on the ground plane (which is to a good approximation given by the pathlength to the midpoint of the interferometer baseline) (km);

$D_{base}$ is the length of the interferometer baseline 112 (i.e., the distance between the two satellites) (km);

and $\Phi_{base}$ is the angle 114 of the interferometer baseline with respect to the normal to the ground plane (rad).

The above described relationship is intended for illustrative purposes only and has been derived based on a highly simplified flat earth model where the observer 110 and the two satellites 106, 108 are all in the same plane. If the radiation transmitted (or received) by the satellites 106, 108 were monochromatic (i.e., of vanishingly small bandwidth) then the resulting fringe pattern would appear locally sinusoidal and extend over the entire coverage area. In a monochromatic condition, the separation of the fringes would still vary over the coverage area due to the variation in the slant range 100.

In the more realistic case where the transmitted (or received) radiation is not monochromatic, the amplitude of the fringes varies across the coverage area. In this case, the amplitude of the fringes is maximum where the pathlengths 102, 104 to the two satellites 106, 108 of the interferometer are equal (i.e., the nominal position of the intended user) and falls off as the pathlength difference increases.

The fringe envelope is determined by the autocorrelation function of the transmitted (or received) signal, and can be calculated according to the following equations:

$$[h_{RF} \not\!\!\!\ast\; h_{RF}]\left(\frac{\Delta r}{c}\right)$$

where t represents time (sec);

v represents frequency (Hz);

c represents the speed of light (2.99792458×10⁸ m/sec);

$\Delta r$ is the difference in pathlength from the point in question on the ground plane to the two elements of the interferometer (m);

$h_{RF}$ is the transmitted (or received) signal waveform (volts);

and $H_{RF}$ is the spectral density of the transmitted (or received) signal (volt-sec).

Based on a determination of the fringe envelope, the second relevant parameter characterizing the fringe pattern, which is the width of the envelope of the fringe pattern, can be derived. This is derived from the autocorrelation width of the signal, which is in turn given by the reciprocal of the noise equivalent bandwidth as shown below:

$$\Delta x = \frac{c\bar{r}}{2W_N D_{base} \sin\phi_{base}}.$$

where $\Delta x$ is the (half) width of the fringe pattern envelope on the ground plane (m);

and $W_N$ is the noise equivalent bandwidth of the signal (Hz).

These two results may be summarized by the following expression:

$$\frac{\lambda_{IF}}{\lambda} = \frac{\bar{r}}{D_{base} \sin\phi_{base}} = \frac{2\Delta x}{c/W_N}$$

As shown, the denominator of the central expression is the length of the interferometer baseline 112 projected onto the ground plane. Also, the presence of the slant range 100 $\bar{r}$, implies a dependence on the position of the user 110.

The impact of the above detailed two fringe pattern parameters is summarized as follows. First, the condition for coherence of the signals received by (transmitted from) the two elements 106, 108 of the interferometer requires the position of the user 110 to be known (and corrected) to within a tolerance which is much less than $\lambda_{IF}$. Conversely, the signals are essentially incoherent for some other user who is displaced from the position of the intended user 110 by a distance of more than $\Delta x$. Signals received from users positioned between these two locations are partially coherent. These concepts for the case of a representative cluster at geosynchronous altitude based on UHF Follow-On are illustrated graphically in FIG. 7.

Figure 7:
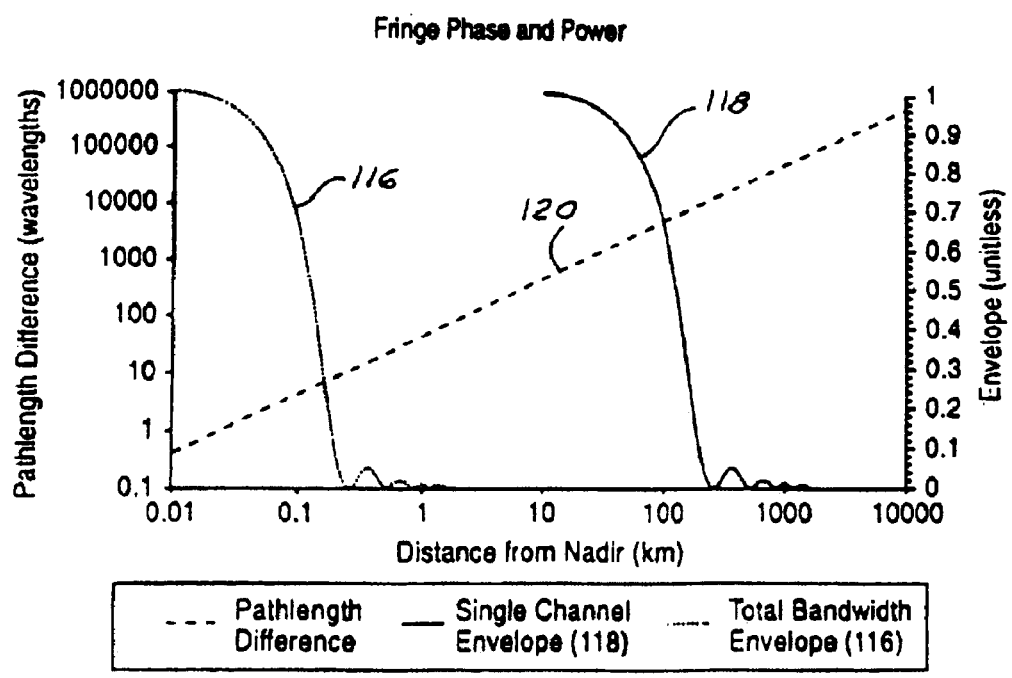
FIG. 7 is an exemplary graph plotting fringe phase and power envelope for a pair of transponder nodes in accordance with a preferred embodiment of the present invention.

FIG. 7 is based on a spherical earth model rather than the simplified planar model which was used to derive the above relations and is a graph plotting fringe phase on the right axis and power envelope on the left axis. For this illustrative example, it is assumed that two satellites 106, 108 are in neighboring orbital slots, separated by 2° longitude. Two cases are shown in the figure which corresponding to available bandwidths of 25 KHz (single channel) as generally represented by reference number 116, and 20 MHz (total bandwidth) as generally represented by reference number 118, respectively. The line 120 represents the pathlength difference in wavelength between the satellites 106, 108, or equivalently the fringe phase.

In accordance with the preferred embodiment, it is desirable that signals received from or by the intended user 110 be coherent across the entire satellite cluster after appropriate correction for pathlength delay. According to the above relationships, a constraint is placed on the precision of the range correction algorithm:

$$\varepsilon_x << \frac{\varepsilon_{tol} \lambda_{min} r_{min}}{\Delta D_{x\;max}}$$

where $\varepsilon_x$ is the tolerance within which the position of the intended user 110 must be known on the ground plane (m);

$\varepsilon_{tol}$ is the allowed tolerance on fractional phase error for coherence of the signal received by the intended user (cycles);

$\lambda_{min}$ is minimum wavelength over the signal bandwidth (m);

$r_{min}$ is the minimum distance from any satellite of the cluster to any point in the coverage area (km);

and $\Delta D_{x\;max}$ is the size (diameter) of the cluster projected onto the x-axis of the ground plane (km).

Similarly, it is desirable that the signals received from or by any non-intended user via any two satellites of the cluster be incoherent with each other. Again applying the above relations, this places a constraint on the minimum acceptable separation between users:

$$\Delta x_{min} \geq \frac{cr_{max}}{2W_N \delta D_{x\ min}}$$

where $\Delta x_{min}$ is the minimum distance between any two users on the ground plane (m);
$r_{max}$ is the maximum distance from any satellite of the cluster to any point in the coverage area (km);
and $\delta D_{x\ min}$ is the minimum distance between any two satellites of the cluster projected onto the x-axis of the ground plane (km).

As pointed out above, it is primarily the satisfaction of these two constraints (1) tolerance with which the user position is known and (2) minimum distance between users (in particular, the parameters $\Delta D_{x\ max}$ and $\delta D_{x\ min}$), which is simplified using a cluster of satellites in slightly perturbed geostationary orbits.

Figure 8:
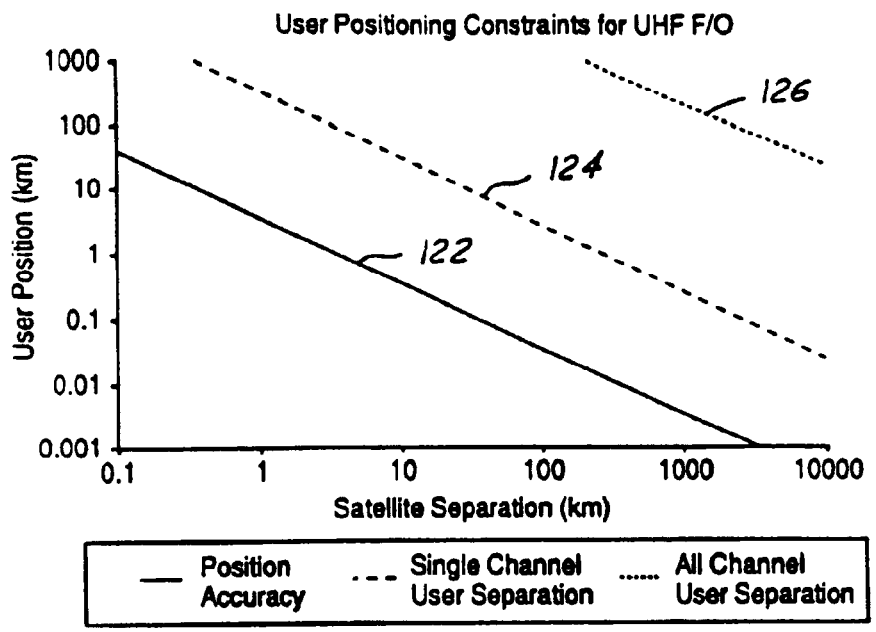
FIG. 8 is an exemplary graph illustrating the constraints on the positions of the various users (intended and interfering) relative to the nominal position of the intended user in accordance with a preferred embodiment of the present invention.

The constraints on user density and location are illustrated graphically in FIG. 8 as functions of cluster size and density for the case of a satellite cluster at geosynchronous altitude, namely, UHF Follow-On. FIG. 8 illustrates user position accuracy 122, single channel user separation 124, and all channel user separation 126, shown on the y-axis, as functions of the satellite separation, shown in the x-axis. The results shown in FIG. 8 are exemplary and correspond generally (the slant range assumptions differ somewhat) to a satellite separation of 2°, or 1472 km. Similar to above, the two conditions are evaluated corresponding to available bandwidth of 25 KHz 124 and 20 MHz 126. The user in this example is assumed to be located on the equator. With respect to the minimum allowed user separation $\Delta x_{min}$, it has been determined that a system using the total available bandwidth has an advantage of three orders of magnitude as compared with a system having the allocated bandwidth of a single channel. This, however, is compensated for by the fact that there are 1000 channels available in the latter system.

In accordance with the preferred embodiment, the disclosed system 10 utilizes a cluster of satellites 16 in slightly perturbed geostationary orbits. By selecting the orbital characteristics of the various satellites 16 properly, the resulting satellite motion appears (when viewed from the ground) to follow a circular path around the cluster center with a period of one day. The cluster center about which the satellites 16 appear to revolve is the position of a satellite 16 in the corresponding unperturbed geostationary orbit. It is not required, however, that any of the cluster satellites actually occupy this orbit. Furthermore, the apparent satellite motion about the cluster center is at a nearly uniform rate.

In determining the proper orbital characteristics, a preferred coordinate system is first defined in which the z-axis is in the direction of the earth's pole, which is also the orbit normal of a geosynchronous orbit. In this coordinate system, the x-axis is directed outward from the satellite 16 in the zenith direction. The y-axis is positioned so it points towards the east. Furthermore, the coordinate system is centered at the cluster center, which is the position of a satellite 16 in the nominal (unperturbed) geosynchronous orbit. In this coordinate system, the position of the earth is fixed on the negative x-axis. As this example is based on a geosynchronous reference orbit, the earth does not rotate in this frame and the positions of the various users may be regarded as fixed. In addition to the preceding coordinate definition, it is also preferable to define the time origin so that it corresponds to the time when a satellite in the perturbed orbit is at perigee.

Once the coordinate system has been defined, the effect of perturbing only the eccentricity of the orbit on the radial (x) component of the motion is first considered. The motion of the satellite in the coordinate system defined above is confined to the xy (equatorial) plane, since the inclination of the orbit is still identically zero. According to Kepler's First Law, the orbital motion (in an inertial coordinate system) is an ellipse with the earth at one focus. The radial component of the motion in the above-defined system of coordinates is then determined as follows:

$$x = \frac{a_{GEO}(1-\varepsilon^2)}{1+\varepsilon\cos\theta} - a_{GEO} \cong -a_{GEO}\varepsilon\cos\theta \cong -a_{GEO}\varepsilon\cos\left(2\pi\frac{t}{T_{GEO}}\right)$$

where x represents the displacement of the perturbed satellite from the cluster center in the radial direction (km);
$a_{GEO}$ is the radius of the reference geosynchronous orbit (km);
$\varepsilon$ is the eccentricity of the perturbed geosynchronous orbit (m);
t represents the time relative to the time of perigee for a satellite in the perturbed orbit (km);
and $T_{GEO}$ represents the period (one sidereal day) of the reference geosynchronous orbit (sec).

The approximations are valid to first order in the perturbed eccentricity. Furthermore, a zero$^{th}$ order relation between the azimuthal position of the satellite in its orbit and time is adequate in the final expression due to the presence of the eccentricity.

Next, the effect of perturbing only the eccentricity of the orbit on the y (azimuthal) component of the motion is considered. The azimuthal component of the motion may be deduced from an application of Kepler's Second Law, which states that the position vector of the satellite (relative to the center of the earth) sweeps out equal areas in equal times. This is essentially a statement of the conservation of annular momentum.

$$2\pi\frac{t}{T_{GEO}}a_{GEO} = \int_0^\theta r^2(\theta')d\theta' = \quad (1)$$

$$\int_0^\theta \left[\frac{a_{GEO}(1-\varepsilon^2)}{1+\varepsilon\cos\theta'}\right]^2 d\theta' \cong a_{GEO}\int_0^\theta (1-2\varepsilon\cos\theta')d\theta' =$$

$$a_{GEO}(\theta - 2\varepsilon\sin\theta)$$

$$y \cong a_{GEO}\left(\theta - 2\pi\frac{t}{T_{GEO}}\right) = 2a_{GEO}\varepsilon\sin\theta \cong 2a_{GEO}\varepsilon\sin\left(2\pi\frac{t}{T_{GEO}}\right) \quad (2)$$

where y represents the displacement of the perturbed satellite from the cluster center in the east direction (km);
and r represents the radial distance of the satellite in the perturbed orbit from the center of the earth (km).

The first equation (1) above is simply a statement of Kepler's Second Law for both the reference circular orbit (on the left) and the perturbed orbit. The second equation (2) expresses the result in the coordinate system being used here.

The effect of perturbing the inclination of the orbit on the z (north) component of the motion is now considered. It can be seen from the equation below that perturbing the inclination will not (to first order) affect the preceding results, since the perturbation is normal to the equatorial plane. The magnitude of the displacement from the equatorial plane will be proportional to the distance of the satellite from the line of nodes where the perturbed orbit plane intersects the equatorial plane. The displacement can therefore be expressed as follows:

$$z = r(\theta)\sin(\theta - \theta_0)\sin i \cong a_{GEO}\sin i \sin(\theta - \theta_0) \cong a_{GEO}\sin i \sin\left(2\pi\frac{t - t_0}{T_{GEO}}\right)$$

where z represents the displacement of the perturbed satellite from the cluster center in the north direction (km);

$\theta_0$ represents the azimuthal position of the satellite as it crosses the equatorial plane (line of nodes) in the ascending direction (sec);

and $t_0$ represents the time at which the satellite crosses the equatorial plane (line of nodes) in the ascending direction (sec).

Once again, it has been noted that the perturbed inclination is already small, so that zero$^{th}$ order approximations for the radial position of the satellite and the relation between azimuth and time are adequate.

If it is assumed that the motion described by the above equations is confined to a plane, then the normal to that plane can be derived from the cross-product of the position vector at any two times. Taking one of these times to correspond to the time at which the satellite crosses the equatorial plane, the following equation is derived:

$$z = r(\theta) =$$

$$r(\theta)\sin(\theta - \theta_0)\sin i \cong a_{GEO}\sin i \sin(\theta - \theta_0) \cong a_{GEO}\sin i \sin\left(2\pi\frac{t - t_0}{T_{GEO}}\right)$$

$$p(\theta_0) \times p(\theta) \cong (a_{GEO}\varepsilon)^2 \begin{pmatrix} -\cos\theta_0 \\ 2\sin\theta_0 \\ 0 \end{pmatrix} \times \begin{pmatrix} -\cos\theta_0 \\ 2\sin\theta \\ \frac{\sin i}{\varepsilon}\sin(\theta - \theta_0) \end{pmatrix} =$$

$$a_{GEO}^2 \varepsilon \sin i \sin(\theta - \theta_0) \begin{pmatrix} 2\sin\theta_0 \\ \cos\theta_0 \\ -2\left(\frac{\varepsilon}{\sin i}\right) \end{pmatrix}$$

where p denotes the position vector of the satellite in the coordinate system under consideration (m).

The derived motion is planar, since the dependence on time is confined to the magnitude of the cross-product, and not its direction. Furthermore, the motion may be recognized to trace out an ellipse with its geometrical center at the cluster center. This is seen from the above equations as the x and y components of the motion define an elliptical cylinder and also noting that the intersection of this cylinder with an arbitrary plane (e.g., the plane normal to the user line of sight) must be an ellipse.

The above expressions are derived based on an observer located at the sub-satellite point corresponding to the cluster center. As discussed above, the perturbations applied to the reference geostationary orbit are assumed small. From these relations, it can be seen that the conditions for circular apparent motion of the perturbed satellite relative to the cluster center as seen by an observer at the nadir are determined as follows:

$$\sin i = 2\varepsilon$$

$$t_0 = \pm\frac{1}{4}T_{GEO}$$

Figure 9:
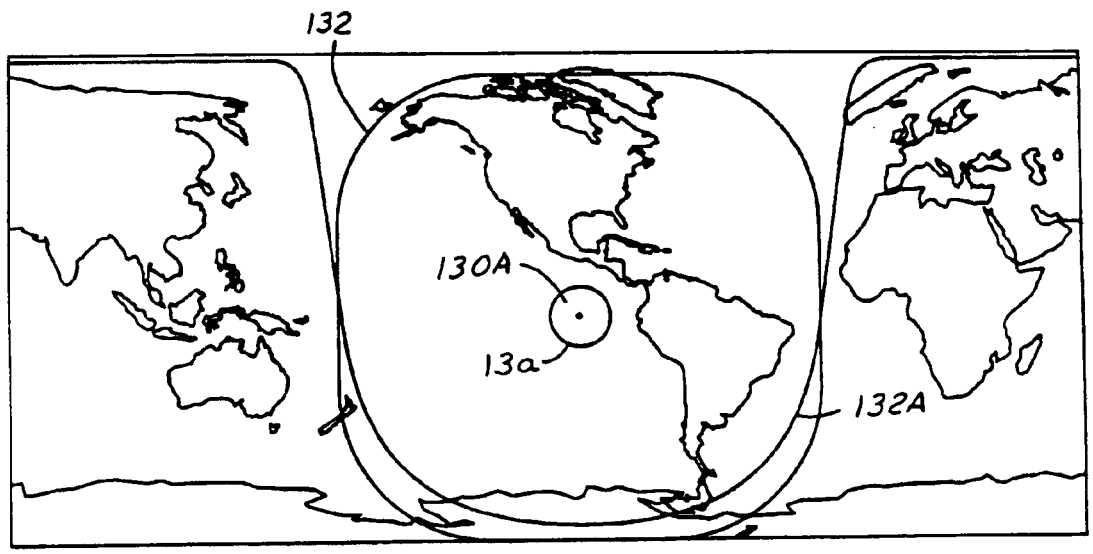
FIG. 9 is an exemplary illustration of the ground traces of two satellites in perturbed geosynchronous orbits.

In this case, the x component of the motion is not seen, and the apparent orbital motion is the projection onto the yz plane. An application of the above results is illustrated in FIG. 9, which shows the ground traces of two satellites in perturbed geosynchronous orbits, such as discussed above, and their respective coverage areas. As shown, the first satellite (Sat 0) is in an unperturbed geosynchronous orbit and has a ground trace stationary at the point 130A. The second satellite (Sat 1) is also in a perturbed geosynchronous orbit and has a ground trace represented by line 130, which appears as a circle. The coverage area served by the first satellite is the interior of the curve 132, and is stationary in time. The coverage area served by the second satellite at a particular instant in time is shown as the region above the curve 132A.

The apparent motions of the various satellites in the cluster can be arranged to appear circular as perceived from any point on the surface of the earth, as described above, by appropriate choice of the perturbed orbital eccentricity and inclination. However, this condition occurs only for a single position of the observer. Other observers not located at this position will perceive the orbited motion to be somewhat elliptical. In accordance with the objects of the present invention, this is acceptable, as long as the displacement of the observer from the optimum location is not too great. For the case of geosynchronous satellites, large displacements of the observer can be allowed without seriously degrading the apparent circular character of the motion. This is because the angular size of the earth as seen from geosynchronous altitude is only about 17.4°.

Based on the above, and in accordance with a preferred embodiment, a relationship exists between the perturbed inclination and the eccentricity such that the perturbed satellite appears to a particular observer to move at constant speed along a circular path. The motion is centered at the position of a (hypothetical) satellite in the unperturbed reference orbit (i.e., the cluster center). This means that the geometry of the cluster can be arranged through suitable choices of the phases and radii of the motions of the various satellites to appear as a slowly rotating, rigid lattice. The apparent inter-satellite separations in this lattice are all relatively constant.

The disclosed system 10 preferably has this configuration, since it constrains the rate of variation of the various pathlength corrections that must be computed and applied in the processing by the ground hub 12. It also allows the system to be configured to ensure that certain pathological cases (such as when the projected baseline between two satellites in the cluster vanishes) do not occur.

In accordance with the operation of the disclosed satellite communication system 10 the satellite constellation is viewed as a sparse radiating (or receiving) array. The more elements (satellites) 16 in the constellation, the better performance the communications system will achieve. Because the system capacity scales with the number of satellites, the addition of more satellites will satisfy additional demand. The capacity of the system is limited primarily by total satellite RF power, which is proportional to the number of satellites in the constellation. This view applies especially well to geosynchronous applications, such as that currently disclosed. In the ideal case where all the (apparent) inter-satellite distances are fixed, the constellation may be viewed as a rigid lattice or aperture which rotates once per day. In the more general case, the apparent inter-satellite distances will vary slightly over the daily period of the motion. This can be visualized in terms of periodic distortions of the rotating aperture.

Perturbed orbits are particularly useful with respect to larger satellite clusters. This can be understood by comparing the above derived constraints on the precision with which the user location is known ($\epsilon_x$), and the user separation or density ($\Delta x_{min}$). The desire to maximize the former, while simultaneously minimizing the latter allows the cluster size to be minimized ($\Delta D_{x\ max}$), while also maximizing the minimum projected distance between satellites in the cluster ($\delta D_{x\ min}$). For clusters containing a very large number of satellites, this is preferably achieved by a circular cluster within which the satellites 16 are uniformly distributed. This follows from the observation that the circle is the geometric figure that inscribes the largest area (i.e., number of satellites) within the smallest dimension. A consequence of this is the fact that the number of satellites 16 that can occupy a given range of longitudes while maintaining a given minimum distance between satellites 16 can be increased as the square of the longitude range.

When there are only two satellites in the cluster, it is preferable to keep the satellites in circular orbits, and simply separate them in longitude. In this case, it has been determined that there is no advantage which can be gained by forming a two-dimensional structure, since the two satellites can never define any more than a single line. Furthermore, there is a potential disadvantage in having a rotating baseline in this case. This is due to the increased complexity required in tracking the satellites, and the rotation of the fringe pattern that results from a rotating baseline. Neither of these conditions would apply when the two satellites are in circular orbits.

In accordance with the preferred system, the architecture allows the system to remain operable with no reconfiguration even after the loss of one or more satellites. However, some reconfiguration of the cluster geometry may be required after satellite loss in order to achieve optimum performance from the diminished cluster. The main consequence resulting from the loss of a satellite is a proportionate decrease in system capacity. Consequently, the disclosed system provides graceful degradation characteristics, providing very high reliability and availability, as discussed above. This will result in little or no impact on the user terminals or other satellites in the space segments. Additionally, the hub processing capability can be built up of highly modular components allowing for easy expansion in a modular fashion.

As discussed above, an important aspect of the system 10 is that the complexity of the system is preferably concentrated in the ground hubs 12. In particular, the hubs 12 locate and track the potential users, insert appropriate time delays into the signals for each combination of user and satellite, and perform the major functions of beam-forming, synchronization and filtering. It should be understood that each satellite functions as a simple single channel transponder or "bent pipe" and can be of a very simple design. The complexity of processing performed in the hub scales roughly as the product of the number of users and the number of satellites. Since the capacity is proportional to the number of satellites, it follows that hub complexity scales roughly as the square of the number of satellites. The complex processing requirements are concentrated in the ground hubs 12 and not the satellites or mobile user terminals.

Studies have been performed to examine the growth in capacity (i.e., the Shannon-Hartley capacity) of a system employing the disclosed architecture as satellites are added to the space segment. The main conclusion of these studies is that the capacity of a Multiple Satellite Communication System continues to grow as more satellites are added. This growth in capacity is in contrast to what would be achieved by a comparable FDMA system, whose total system capacity remains roughly constant as more satellites are added. Ultimately, the number of users in the disclosed system is limited by the minimum user separation constraint $\Delta x_{min}$ and also by regulatory constraints on the maximum permissible power flux density.

One embodiment of the present invention is to apply it to the UHF Follow-On constellation. The basic UHF constellation contains eight geostationary satellites organized into four satellite pairs. Any one of these satellite pairs could be configured as a simple two-element system in accordance with the present invention. The UHF subsystem of UHF Follow-On appears to be the best candidate for an application of the disclosed architecture, since this subsystem performs the least processing of the signal and, therefore, most closely satisfies the requirement for bent-pipe operation. This subsystem operates in a 20 MHz frequency band, which is divided into 25 kHz channels. The uplink for the UHF subsystem at 305 MHz is used as a point of reference in the above examples; no computations are done for the downlink at 253.5 MHz. These parameters are applied to the representative cases illustrated in FIGS. 7 and 8 above.

It should be understood while the preferred system 10 uses multiple satellites, a variety of other transponder platforms or individual transponder nodes may be utilized. For example, any high altitude platform may be used or a regional or national tower system may also be used. It is even possible to utilize a mixture of transponder types.

Having now fully described the invention, it will be apparent to one of ordinary skill in the art that many changes and modifications can be made thereto without departing from the spirit or scope of the invention as set forth herein.

What is claimed is:

1. A method for transmitting communications signals to a plurality of mobile terminals, comprising:

processing a received signal at a ground hub;

radiating a first portion of said signal and a second portion of said signal through multiple paths to at least two satellites;

re-radiating said signal from said at least two satellites to an intended mobile terminal;

combining the first portion of the signal and the second portion of the signal at the mobile terminal to reform the signal;

whereby an orbit of said satellite is being perturbed in inclination and eccentricity relative to a common geosynchronous reference orbit;

whereby apparent satellite motion of said at least two satellites about the geosynchronous reference orbit remain substantially uniform.

2. The method of claim 1, further comprising:

radiating a signal from said intended mobile terminal to said at least two perturbed satellites;

re-radiating said signal from said at least two perturbed satellites to said ground hub.

3. The method of claim 2, further comprising:

determining a relationship between said inclination and said eccentricity of said satellites such that they appear to move at a constant speed along circular paths whose centers are located at the position of a hypothetical reference satellite in an unperturbed geosynchronous orbit.

4. The method of claim 3, further comprising:

maintaining the geometry of said cluster of at least two satellites such that the distances between any two of said satellites is relatively constant.

5. The method of claim 4, further comprising:

adding additional satellites to said at least two satellites to augment the satellite constellation.

6. The method of claim 4, wherein the conditions for circular apparent motion of the perturbed satellite relative to said satellite constellation center is approximated by the following:

$$\sin i = 2\epsilon$$
$$t_o = \pm \tfrac{1}{4} t_{GEO}.$$

7. A mobile wireless communication system, comprising:
a satellite constellation consisting of a plurality of satellites, each of the plurality of satellites in an orbit that is a perturbed geosynchronous orbit centered about a geosynchronous reference orbit position;
each of said plurality of satellites being capable of relaying signals between the ground hub and the plurality of user terminals in either direction;
whereby as said satellite constellation appears to rotate at a uniform rate above the geosynchronous reference orbit as viewed by a single user so that the apparent inter-satellite spatial relationships are maintained.

8. The mobile wireless communication system of claim 7, wherein each of said plurality of satellites has its inclination and eccentricity perturbed relative to a common geosynchronous reference orbit.

9. The mobile wireless communication system of claim 7, wherein the respective distances among the said plurality of satellites is substantially constant.

10. The mobile wireless communication system of claim 8, wherein the orbit of each of said plurality of satellites is perturbed such that it appears to move at a constant speed along a circular path as viewed by a single user.

$$\sin i = 2\varepsilon$$
$$t_o = \pm \frac{1}{4} T_{GEO}.$$

11. The mobile wireless communication system of claim 7, wherein in order for coherent reception of signals by their intended user, said intended user's location must be determined to within a specified tolerance $\epsilon_x$, which is determined according to the following equation:

$$\varepsilon_x \ll \frac{\varepsilon_{tot} \lambda_{min} r_{min}}{\Delta D_{x\,max}}.$$

12. The mobile wireless communication system of claim 7, wherein in order for incoherent reception of signals from interfering (non-intended) users, said interfering users must be displaced at least a distance $$\Delta x_{min} \geq \frac{cr_{max}}{2w_N \delta \Delta D_{x\,min}}$$

from the user receiving the signal.

13. The mobile wireless communication system of claim 10, wherein the apparent motions of said plurality of satellites in said satellite constellation can be arranged to appear circular as perceived from any one point in the coverage area.

14. A method for establishing a link between a ground hub and a plurality of mobile terminals, comprising:
preprocessing a received signal at said ground hub;
transmitting a first portion and a second portion of said signal through different paths to a plurality of satellites in a satellite constellation to an intended one of the mobile terminals;
combining the first portion of the signal and the second portion of the signal at the mobile terminal to reform the signal;
perturbing the inclination and eccentricity of said plurality of satellites relative to a common geosynchronous reference orbit; and
determining a relationship between said inclination and said eccentricity of said plurality of satellites such that they appear to move at a constant speed along circular paths where centers are located at a position defined by a hypothetical reference satellite in an unperturbed geosynchronous orbit.

15. The method of claim 14, further comprising:
maintaining the periods of geosynchronous orbit of said plurality of satellites substantially constant.

16. The method of claim 14, further comprising:
maintaining the apparent inter-satellite spatial relationships between said plurality of satellites as they appear to rotate.

17. The method of claim 14, wherein said relationship is approximated by the following:

$$\sin i = 2\varepsilon$$
$$t_o = \pm \frac{1}{4} T_{GEO}.$$

18. The method of claim 14 wherein in order for incoherent reception of signals from interfering (non-intended) users, said interfering users must be displaced at least a distance $$\Delta X_{min} \geq \frac{Cr_{MAX}}{2W_N \delta \Delta D_{xMIN}}$$

from the user receiving the signal.

19. The method of claim 14, wherein in order for coherent reception of signals by their intended user, said intended user's location must be determined to within a specified tolerance $\epsilon_x$, which is determined according to the following equation:

$$\varepsilon_x \ll \frac{\varepsilon_{tot} \tau_{min} r_{min}}{\Delta_{x\,min}}.$$

* * * * *